(12) United States Patent
Holda (10) Patent No.: US 11,313,409 B1
(45) Date of Patent: Apr. 26, 2022

(54) CRANKSHAFT AND CRANKTRAIN FOR INTERNAL COMBUSTION ENGINE

(71) Applicant: Brunswick Corporation, Mettawa, IL (US)

(72) Inventor: Joseph A. Holda, West Bend, WI (US)

(73) Assignee: Brunswick Corporation, Mettawa, IL (US)

( * ) Notice: Subject to any disclaimer, the term of this patent is extended or adjusted under 35 U.S.C. 154(b) by 50 days.

(21) Appl. No.: 16/997,536

(22) Filed: Aug. 19, 2020

Related U.S. Application Data

(60) Provisional application No. 62/950,431, filed on Dec. 19, 2019.

(51) Int. Cl.
*F16C 3/14* (2006.01)
*F01M 1/06* (2006.01)

(52) U.S. Cl.
CPC .............. *F16C 3/14* (2013.01); *F01M 1/06* (2013.01); *F01M 2001/062* (2013.01)

(58) Field of Classification Search
CPC .... F16C 3/14; F16C 9/02; F01M 1/06; F01M 2001/062; F01M 2011/026; F02B 75/007
See application file for complete search history.

(56) References Cited

U.S. PATENT DOCUMENTS

| | | | |
|---|---|---|---|
| 1,288,302 A | 12/1918 | Vincent | |
| 1,872,365 A | 8/1932 | Underwood | |
| 2,419,408 A | 4/1947 | Lightowler | |
| 2,899,015 A | 8/1959 | Leach et al. | |
| 3,785,459 A | 1/1974 | Patchen | |
| 5,009,522 A | 4/1991 | Hahn | |
| 5,138,991 A | 8/1992 | Wojdyla | |
| 5,152,373 A | 10/1992 | Callies | |
| 5,163,341 A | 11/1992 | Murrish et al. | |

(Continued)

FOREIGN PATENT DOCUMENTS

| | | | | |
|---|---|---|---|---|
| DE | 355265 C | 6/1922 | | |
| DE | 102017102313 A1 * | 8/2018 | ............... | F01M 1/06 |

(Continued)

OTHER PUBLICATIONS

Holda et al., "Crankshaft Arrangements Having Improved Torsional Stiffness, Mass, and Natural Frequency" U.S. Appl. No. 15/591,729, filed May 10, 2017.

*Primary Examiner* — Grant Moubry
(74) *Attorney, Agent, or Firm* — Andrus Intellectual Property Law, LLP (57) ABSTRACT

A crankshaft has a main journal surrounded by a main bearing defining a groove provided with oil from an oil gallery and at least one oil inlet formed in the main journal providing oil from the groove into the main journal. A first crankpin journal is connected to a first side of the main journal by way of a first web. A second crankpin journal is connected to a second side of the main journal by way of a second web. Pairs of crankpin bearings are provided around each of the first and second crankpin journals. Each crankpin bearing supports a piston rod thereon. Each of the first and second crankpin journals has a pair of oil outlets providing oil to a respective crankpin bearing. Oil passageways in the crankshaft provide the pairs of oil outlets in both the first and second crankpin journals with oil from the main journal.

20 Claims, 8 Drawing Sheets

(56) References Cited

U.S. PATENT DOCUMENTS

| | | | | |
|---|---|---|---|---|
| 5,950,588 | A * | 9/1999 | Kusche | F01M 11/02 123/196 R |
| 6,012,421 | A * | 1/2000 | Kusche | F01M 3/00 123/196 R |
| 6,202,620 | B1 | 3/2001 | Yamaguchi | |
| 6,474,288 | B1 * | 11/2002 | Blom | F02B 75/36 123/197.2 |
| 6,857,411 | B2 | 2/2005 | Ronneburger | F01M 1/06 123/196 R |
| 7,152,569 | B2 | 12/2006 | Leiber et al. | |
| 7,198,019 | B1 * | 4/2007 | Belter | F01M 11/02 123/196 R |
| 7,350,498 | B2 | 4/2008 | Matsuda | |
| 7,954,600 | B2 | 6/2011 | Ohta | |
| 8,307,804 | B2 | 11/2012 | Ohta | |
| 8,578,895 | B2 * | 11/2013 | Baldini | F02B 33/30 123/65 B |
| 8,667,947 | B2 | 3/2014 | Ota et al. | |
| 9,046,124 | B2 * | 6/2015 | Beaurepaire | F16C 17/022 |
| 9,944,373 | B1 | 4/2018 | Kollock et al. | |
| 10,072,699 | B2 * | 9/2018 | Uesu | F16C 35/02 |
| 2010/0107808 | A1 * | 5/2010 | Alderton | F16C 3/14 74/605 |
| 2012/0111143 | A1 * | 5/2012 | Tanabe | F16C 9/04 74/602 |
| 2014/0260787 | A1 * | 9/2014 | Kumar | C21D 1/09 74/605 |
| 2015/0184690 | A1 | 7/2015 | Kamiya et al. | |
| 2016/0061106 | A1 | 3/2016 | Verma et al. | |
| 2017/0261029 | A1 * | 9/2017 | De Rooij | F16C 33/1065 |

FOREIGN PATENT DOCUMENTS

| | | |
|---|---|---|
| EP | 2412993 B1 | 12/2014 |
| GB | 1155803 A | 6/1969 |
| JP | 5342634 B2 | 11/2013 |

\* cited by examiner

CRANKSHAFT AND CRANKTRAIN FOR INTERNAL COMBUSTION ENGINE

CROSS-REFERENCE TO RELATED APPLICATION

The present application claims the benefit of U.S. Provisional Application Ser. No. 62/950,431, filed Dec. 19, 2019, which is hereby incorporated by reference in its entirety.

FIELD

The present disclosure relates to crankshafts and cranktrains for internal combustion engines, and more specifically to how lubricating oil is provided to working components of a cranktrain.

BACKGROUND

U.S. Pat. No. 9,944,373, which is hereby incorporated by reference in its entirety, discloses an outboard marine engine comprising a vertically aligned bank of piston-cylinders; a camshaft that operates a plurality of valves for controlling flow of air with respect to the vertically aligned bank of piston-cylinders, the camshaft vertically extending between a lower camshaft end and an upper camshaft end; and a cam lobe at the upper camshaft end. Rotation of the camshaft causes the cam lobe to cam open an uppermost valve in the plurality of valves. A lubricant circuit extends through the camshaft and has a lubricant outlet located at the upper camshaft end. The lubricant outlet is configured to disperse lubricant onto the uppermost valve, which is located above an uppermost cam bearing bulkhead for the upper camshaft end.

U.S. patent application Ser. No. 15/591,729, filed May 10, 2017, which is hereby incorporated by reference in its entirety, discloses a crankshaft for an engine having main bearings and piston rods. The crankshaft has a first end configured to couple to a flywheel, an opposite second end, and a node between the first and second ends having zero displacement at resonant frequency. A series of main journals and a series of pin journals are spaced apart along the crankshaft and configured to operatively engage the main bearings and piston rods, respectively. A series of webs is located between the node and the second end of the crankshaft and each web has at a main end formed to one main journal and an opposite pin end formed to one pin journal. A first web is closer to the node than to the second end of the crankshaft and a subsequent web is closer to the second end than to the node. The first web is stiffer than the subsequent web.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a crankshaft comprises a main journal surrounded by a main bearing defining a groove configured to be provided with oil from an oil gallery and at least one oil inlet formed in the main journal configured to provide oil from the groove into the main journal. A first crankpin journal is connected to a first side of the main journal by way of a first web, and a second crankpin journal is connected to an opposite, second side of the main journal by way of a second web. A pair of crankpin bearings is provided around each of the first and second crankpin journals, and each crankpin bearing configured to support a piston rod thereon. Each of the first and second crankpin journals has a pair of oil outlets formed therein, and each oil outlet configured to provide oil to a respective crankpin bearing. Oil passageways in the crankshaft are configured to provide the pairs of oil outlets in both the first and second crankpin journals with oil from the main journal.

According to another example of the present disclosure, a cranktrain comprises a crankshaft having a first crankshaft section with a main journal surrounded by a main bearing defining a groove configured to be provided with oil from an oil gallery. At least one oil inlet is formed in the main journal and configured to provide oil from the groove into the main journal. The first crankshaft section has a first crankpin journal connected to a first side of the main journal by way of a first web and a second crankpin journal connected to an opposite second side of the main journal by way of a second web. The first crankshaft section also has a first pair of crankpin bearings provided around the first crankpin journal and a second pair of crankpin bearings provided around the second crankpin journal. The cranktrain includes a first pair of rods and associated pistons provided on the first pair of crankpin bearings, respectively, and a second pair of rods and associated pistons provided on the second pair of crankpin bearings, respectively. Both of the first and second crankpin journals have a pair of oil outlets formed therein, each oil outlet configured to provide oil to a respective crankpin bearing. Oil passageways in the crankshaft are configured to provide the pairs of oil outlets in both the first and second crankpin journals with oil from the main journal.

BRIEF DESCRIPTION OF THE DRAWINGS

Examples of crankshafts and cranktrains for internal combustion engines are described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims. Each limitation in the appended claims is intended to invoke interpretation under 35 USC § 112(f) only if the terms "means for" or "step for" are explicitly recited in the respective limitation.

Figure 1:
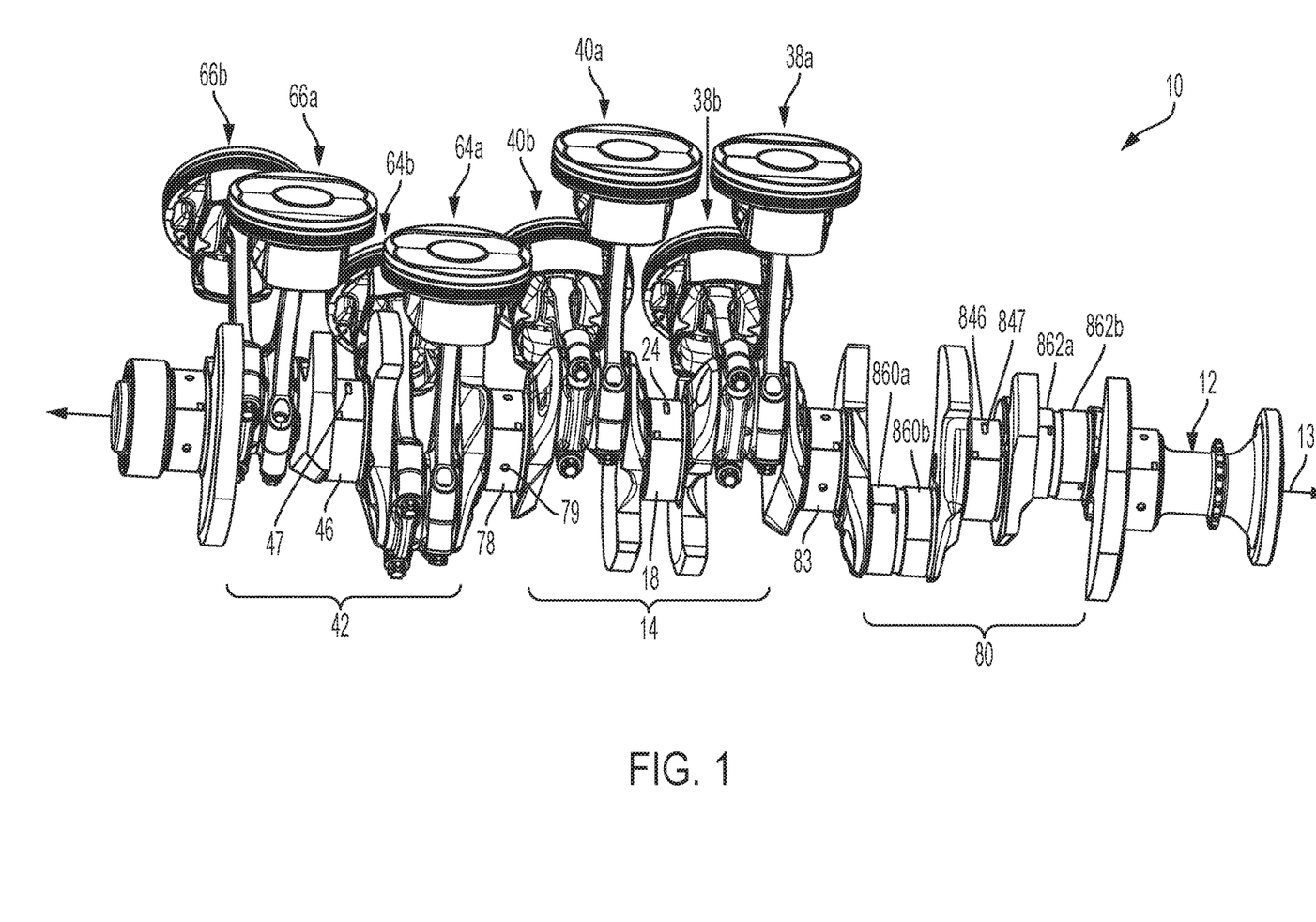
FIG. 1 illustrates a perspective view of a cranktrain according to one example of the present disclosure.
Figure 2A:
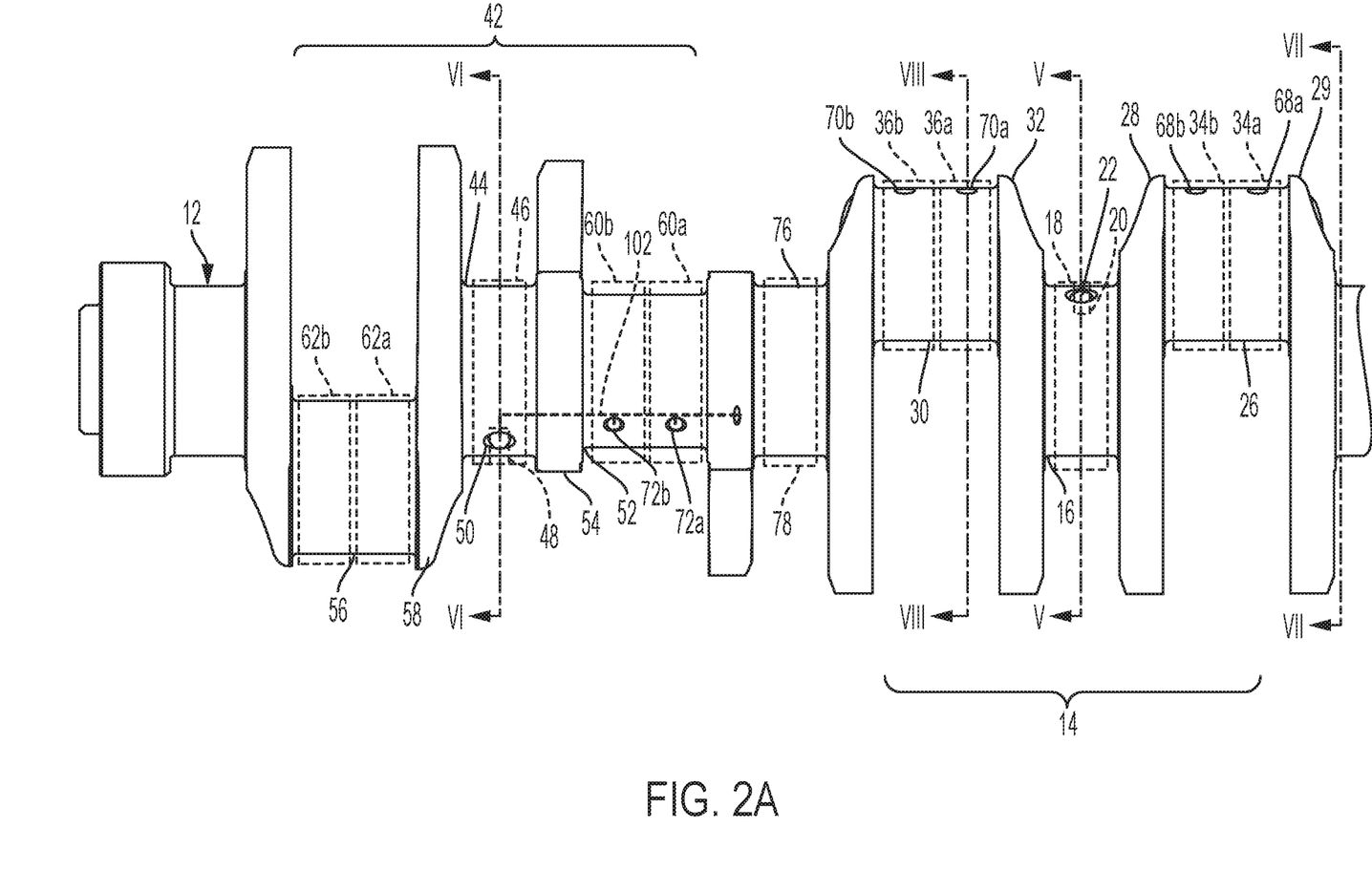
FIGS. 2A and 2B illustrate a first side view of a crankshaft according to one example of the present disclosure.

FIG. 1 illustrates a cranktrain 10 for an internal combustion engine, which can be provided, for example, in a marine outboard motor. The cranktrain 10 comprises a crankshaft 12 comprising a first crankshaft section 14. Referring also to FIG. 2A, the first crankshaft section 14 has a main journal 16 surrounded by a main bearing 18 defining a groove 20 configured to be provided with oil from an oil gallery (as is known) and at least one oil inlet 22 formed in the main journal 16 configured to provide oil from the groove 20 into the main journal 16. Such a grooved journal bearing arrangement is known in the art, wherein the groove 20 is formed on the inside surface of the main bearing 18, and is provided with oil from the oil gallery by way of one or more slits 24 formed through an outer surface of the main bearing 18 (see FIG. 3A). The main bearing 18 can be an eccentric bearing formed of two semi-cylindrical shells, as is known, although other types of plain or journal bearings could be used. The groove 20 can extend along the entire inner perimeter of the main bearing 18, or can be provided in only one semi-cylindrical shell. In the present example, the groove 20 extends along the entire arc of one of the semi-cylindrical shell, but only partway along the other shell. (Compare the extent of groove 20 in FIG. 3A with the extent of groove 20 in FIG. 2A.)

Figure 3A:
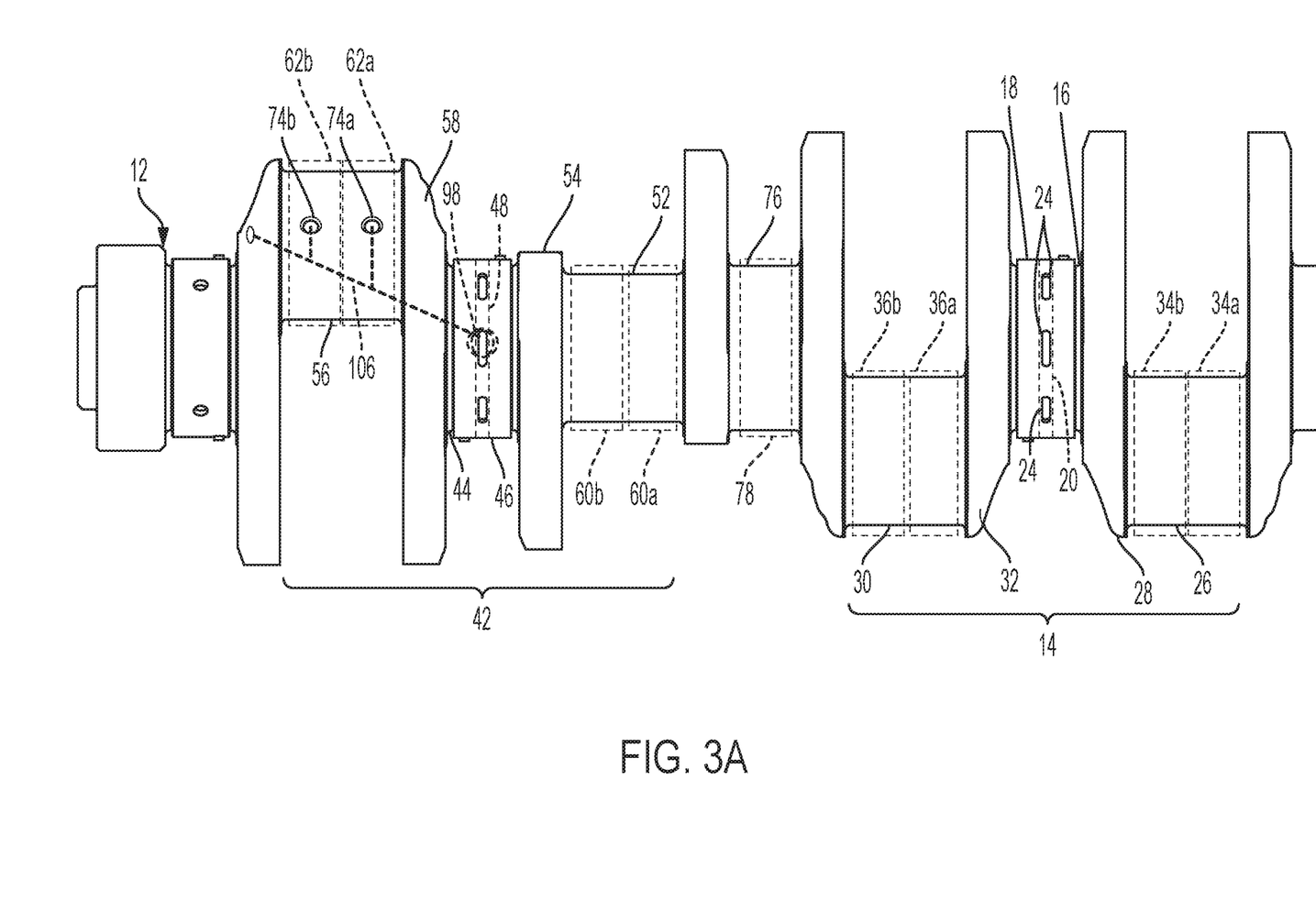
FIGS. 3A and 3B illustrate an opposite side view of the crankshaft of FIGS. 2A and 2B.

Referring to FIGS. 2A and 3A, the first crankshaft section 14 further includes a first crankpin journal 26 connected to a first side of the main journal 16 by way of a first web 28 and a second crankpin journal 30 connected to an opposite second side of the main journal 16 by way of a second web 32. The webs 28, 32 may have counterweights, as shown, or the crankshaft 12 may be otherwise designed to provide balance. A first pair of crankpin bearings 34a, 34b is provided around the first crankpin journal 26. A second pair of crankpin bearings 36a, 36b is provided around the second crankpin journal 30. The first and second pairs of crankpin bearings 34a, 34b, and 36a, 36b may also be eccentric bearings formed of two semi-cylindrical shells having grooves formed on the inside surfaces thereof, although such grooves are not shown herein.

Referring to FIGS. 2A and 3A, the crankshaft 12 further comprises a second crankshaft section 42 having a second main journal 44 surrounded by a main bearing 46 defining a groove 48 configured to be provided with oil from the oil gallery, such as by way of slits 47 (see FIG. 1). At least one oil inlet 50, 98 is formed in the second main journal 44 and is configured to provide oil from the groove 48 into the second main journal 44. A third crankpin journal 52 is connected to a first side of the second main journal 44 by way of a third web 54, and a fourth crankpin journal 56 is connected to an opposite second side of the second main journal 44 by way of a fourth web 58. A third pair of crankpin bearings 60a, 60b is provided around the third crankpin journal 52, and a fourth pair of crankpin bearings 62, 62b is provided around the fourth crankpin journal 56.

Referring back to FIG. 1, a first pair of rods and associated pistons 38a, 38b is provided on the first pair of crankpin bearings 34a, 34b, respectively. A second pair of rods and associated pistons 40a, 40b is provided on the second pair of crankpin bearings 36a, 36b, respectively. A third pair of rods and associated pistons 64a, 64b is provided on the third pair of crankpin bearings 60a, 60b, respectively. A fourth pair of rods and associated pistons 66a, 66b is provided on the fourth pair of crankpin bearings 62a, 62b, respectively. The rods and associated pistons are provided about the respective crankpin bearings in a manner to those having ordinary skill in the art, such as by way of fasteners as shown herein.

Referring to FIG. 2A, both of the first and second crankpin journals 26, 30 have a pair of oil outlets 68a, 68b and 70a, 70b, respectively, formed therein. Each oil outlet 68a, 68b and 70a, 70b is configured to provide oil to a respective crankpin bearing 34a, 34b or 36a, 36b (shown in phantom over the oil outlets). Oil is provided from the oil outlet 68a, 68b, or 70a, 70b to the groove formed on the inside face of the respective crankpin bearing 34a, 34b or 36a, 36b, as is known. Although the grooves are not shown herein, they are similar in design to those shown in phantom inside the main bearings 18, 46 in FIG. 3A. According to the present disclosure, as will be described herein below, oil passageways in the crankshaft 12 are configured to provide the pairs of oil outlets 68a, 68b and 70a, 70b in both the first and second crankpin journals 26, 30 with oil from the main journal 16. Similarly, each of the third and fourth crankpin journals 52, 56 has a pair of oil outlets formed therein. The oil outlets in third crankpin journal 52 can be seen at 72a, 72b in FIG. 2A, while the oil outlets in fourth crankpin journal 56 can be seen at 74a, 74b in FIG. 3A. Each oil outlet 72a, 72b and 74a, 74b is configured to provide oil to a respective crankpin bearing 60a, 60b and 62a, 62b. As will be described further herein below, additional oil passageways in the crankshaft 12 are configured to provide the pairs of oil outlets 72a, 72b and 74a, 74b in both the third and fourth crankpin journals 52, 56 with oil from the second main journal 44.

As shown in FIGS. 1, 2A, and 3A, according to the present disclosure, the first and second crankshaft sections 14, 42 are separated by a third main journal 76 having no oil inlet formed therein. The oil passageway design described herein below allows the rods and pistons 38a, 38b, and 40a, 40b connected to first crankshaft section 14 to be provided with lubricating oil from a single main journal 16, while the rods and pistons 64a, 64b, and 66a, 66b connected to second crankshaft section 42 are provided with oil from a single main journal 44. Thus, the third main journal 76 separating the first and second crankshaft sections 14, 42 need not be used to provide oil to any crankpin bearings. The main bearing 78 provided on the third main journal 76 may include holes 79 therein (see FIG. 1) in order to allow oil to enter the space between the third main journal 76 and the main bearing 78 and lubricate this journal bearing; however, the third main bearing 78 need not be provided with a groove, and (as noted) the third main journal 76 is not provided with an oil inlet, thus reducing leakage of oil and windage in the system.

Figure 2B:
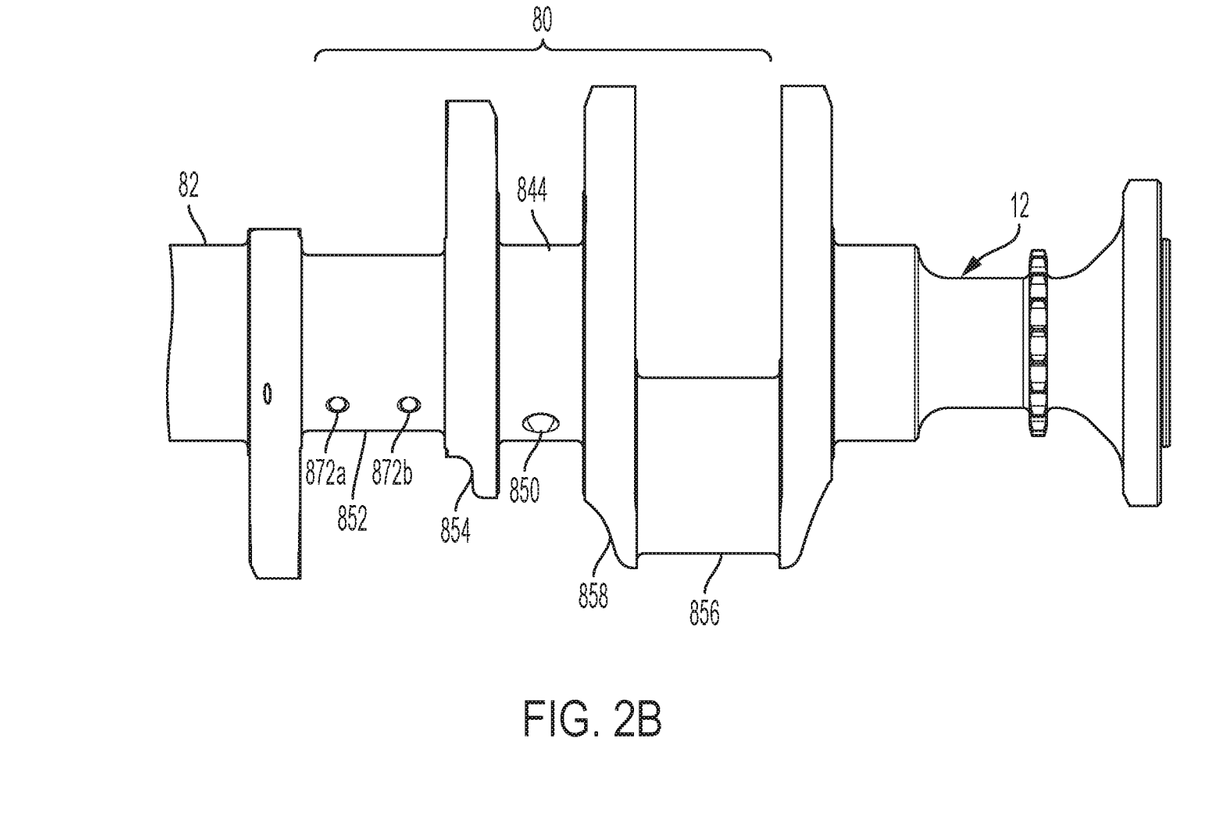
Figure 3B:
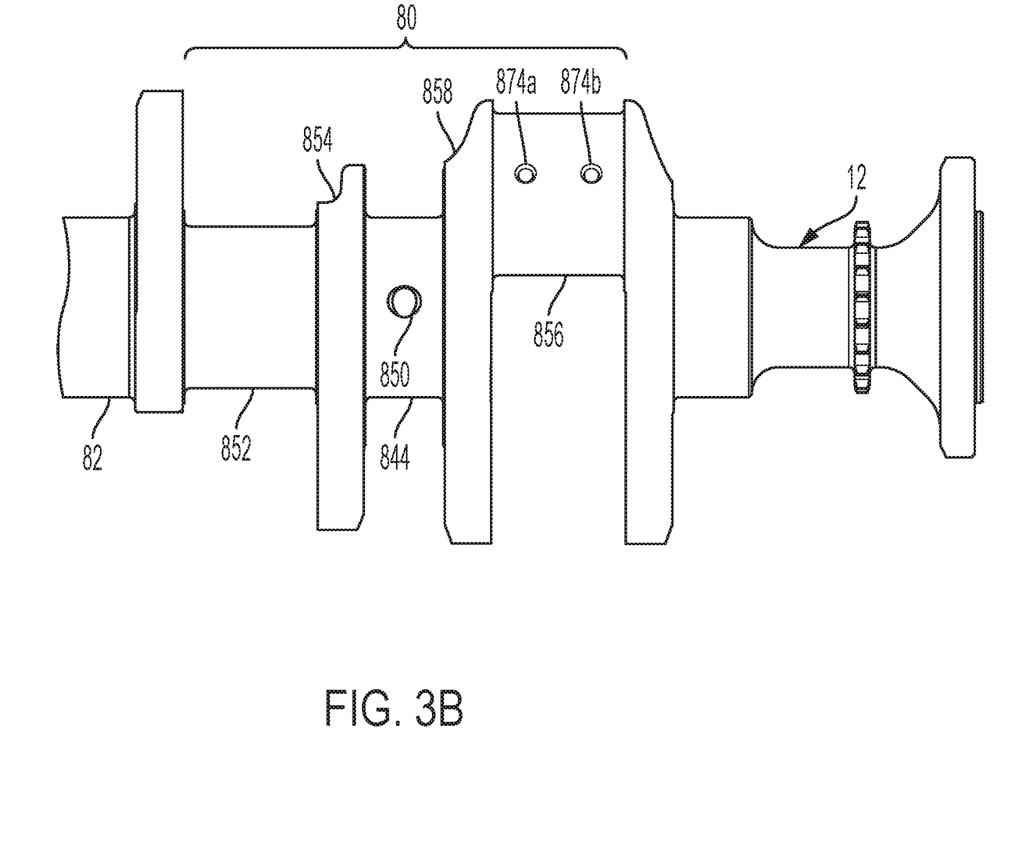

The cranktrain 10 shown in FIG. 1 illustrates rods and pistons only on the flywheel end of the crankshaft 12; however, a mirror image of the rod/piston arrangement on the second crankshaft section 42 would be provided on the other end of the crankshaft 12 along third crankshaft section 80. As shown in FIGS. 1, 2B, and 3B, third crankshaft section 80 includes a fourth main journal 844 having a crankpin journal 852, 856 on either side thereof. The fourth main journal 844 has an oil inlet 850 formed therein for providing lubricating oil into the fourth main journal 844. The crankpin journal 852 has oil outlets 872a, 872b for providing lubricating oil from the fourth main journal 844 to the bearings 860a, 860b provided about the crankpin journal 852. Similarly, the crankpin journal 856 has oil outlets 874a, 874b provided therein for providing lubricating oil from the fourth main journal 844 to the bearings 862a, 862b provided about the crankpin journal 856. The third crankshaft section 80 is separated from the first crankshaft section 14 by a fifth main journal 82 provided with a main bearing 83, which is similar to the main journal 76 and main bearing 78 (i.e., no oil inlet is formed in the fifth main journal 82). It should be understood that any components labels 8XX are similar to the components described hereinabove with respect to the second crankshaft section 42 and will not be described more fully herein. Additionally, it should be understood that the description of the oil passageways about to be described herein below with respect to the second crankshaft section 42 applies equally to the third crankshaft section 80, with the oil passageways in the third crankshaft section 80 being a mirror image of those in the second crankshaft section 42.

Through research and development, the present inventor realized that oil flow from the cranktrain 10 is a primary driver of oil pump sizing and to the windage component of friction mean effective pressure in the crankcase. For example, both a larger oil pump and increased windage reduce efficiency and thus potential power output of the engine, while at the same time increasing heat input to the oil and other engine components, thereby reducing the engine's factor of safety or requiring an oil cooler. Windage is especially an issue on an engine having a vertically oriented crankshaft 12, as used in a marine outboard engine, because oil drain back passes the entire length of the crankshaft 12. The design of the present disclosure reduces excess oil flow into the crankcase by limiting the number of sources of oil flow, i.e., the number of main journal bearings with grooves and oil inlets. The present inventor has determined that limiting the number of main journal bearings with grooves and oil inlets to every other main journal bearing on a V12 engine results in about 40% less oil flow through the cranktrain 10 at speed and at hot idle.

The oil drillings in the crankshaft 12 that allow for a single main journal bearing to receive and distribute oil to four piston rods (two on either side thereof) will now be described.

Figure 4:
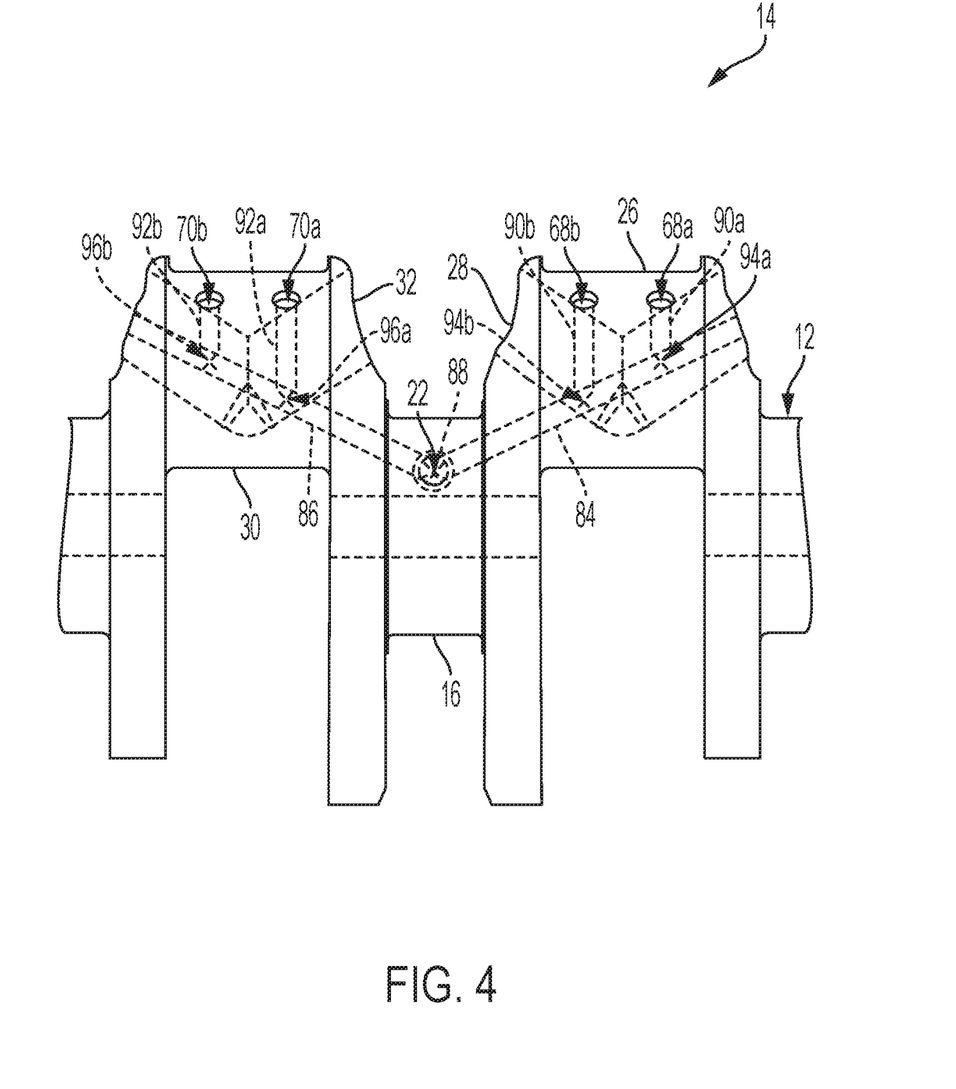
FIG. 4 illustrates another view of a portion of the crankshaft of FIGS. 2A-3B.

FIG. 4 shows an alternative side view of the first crankshaft section 14 according to the present disclosure, rotated such that the view is along the center axis of the at least one oil inlet 22. In the first crankshaft section 14, the at least one oil inlet 22 comprises a single oil inlet. The oil passageways in the first crankshaft section 14 comprise a first oil passageway 84 formed in the first main journal 16, the first web 28, and the first crankpin journal 26. The first oil passageway 84 couples the single oil inlet 22 to the pair of oil outlets 68a, 68b in the first crankpin journal 26. The oil passageways also comprise a second oil passageway 86 formed in the first main journal 16, the second web 32, and the second crankpin journal 30 and coupling the single oil inlet 22 to the pair of oil outlets 70a, 70b in the second crankpin journal 30. More specifically, each crankpin journal 26, 30 comprises a pair of feeder passageways 90a, 90b and 92a, 92b, respectively. The feeder passageway 90a has a longitudinal axis that is perpendicular to the crankshaft's main axis and that intersects the first oil passageway 84 at intersection 94a. The feeder passageway 90b also has a longitudinal axis perpendicular to the crankshaft's main axis and that intersects the first oil passageway 84 at intersection 94b, which is closer to the crankshaft's main axis than intersection 94a. Similarly, in second crankpin journal 30, feeder passageway 92a intersects second oil passageway 86 at intersection 96a, and feeder passageway 92b intersects second oil passageway 86 at intersection 96b.

Figure 5:
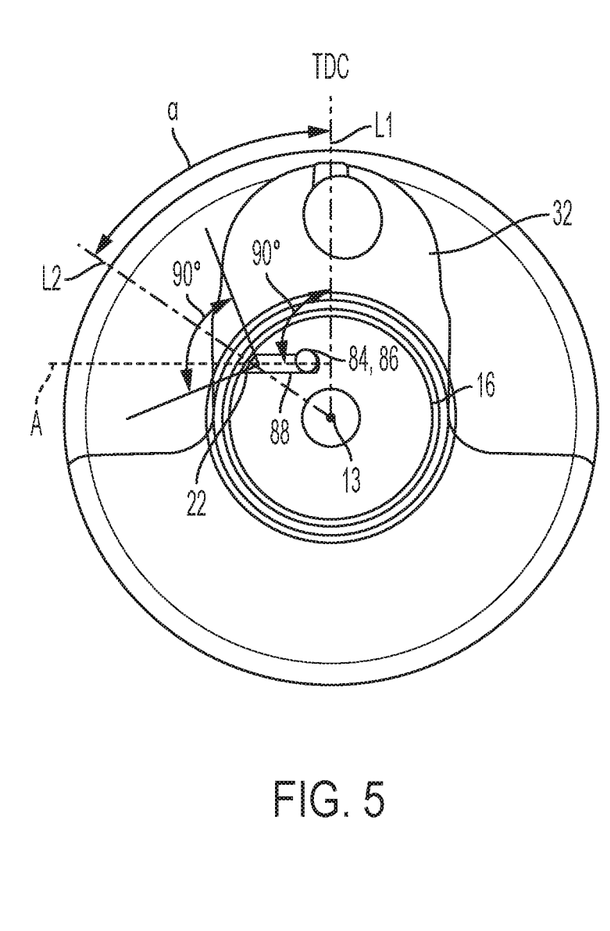
FIG. 5 illustrates a cross-sectional view taken along the line V-V in FIG. 2A.

FIG. 5 shows a cross section through the crankshaft 12 taken along the line V-V in FIG. 2A and rotated so that the top dead center (TDC) position is at zero degrees. In the first main journal 16, the at least one oil inlet 22 is located at an angle α from TDC of at least one of the first and second crankpin journals 26, 30. Here, a is measured between a line L1 running through the main axis 13 of the crankshaft 12 and the TDC position and a line L2 running through the main axis 13 and the center of the oil inlet 22. Because the first and second crankpin journals 26, 30 are in phase with each other, the at least one oil inlet 22 is located at the angle α from TDC of both crankpin journals 26, 30. In one example, the angle α is between 50 and 70 degrees. More specifically, in the present example, the at least one oil inlet 22 is located at 56.3 degrees from TDC. The oil inlet 22 is chamfered such that its opening covers an angle of 90 degrees. The oil inlet 22 provides access to an inlet passageway 88 drilled into the main journal 16 along an axis A that is perpendicular to the line L1 connecting the main axis 13 of the crankshaft 12 to the TDC position. Referring back to FIG. 4, the inlet passageway 88 leads to a bifurcation, from which the first oil passageway 84 and the second oil passageway 86 extend in opposite directions.

Figure 6:
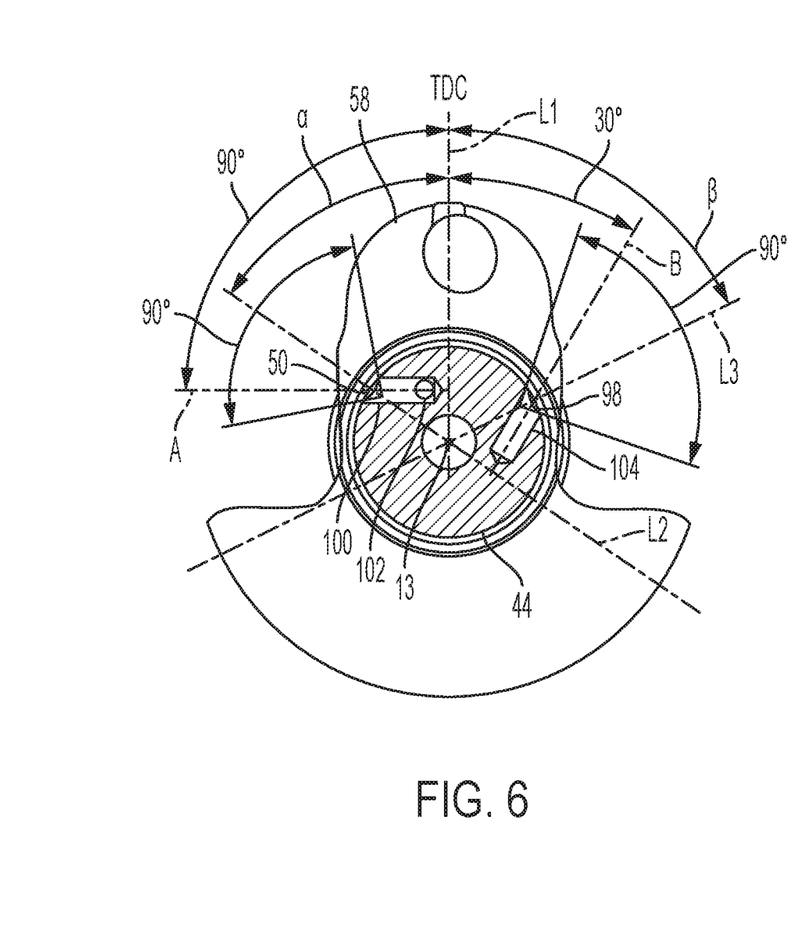
FIG. 6 illustrates a cross-sectional view taken along the line VI-VI in FIG. 2A.

Now referring to FIGS. 2A and 3A, in the second crankshaft section 42, the at least one oil inlet comprises first and second oil inlets 50, 98. Oil inlet 50 is shown in FIG. 2A covered by the main bearing 46 (shown in phantom), while oil inlet 98 is shown in phantom in FIG. 3A behind the main bearing 46. FIG. 6 shows a cross-section along the line VI-VI in FIG. 2A, rotated such that TDC is at zero degrees. It can be seen that the first oil inlet 50 is similar to the single oil inlet 22 in the first crankshaft section 14, in that the first oil inlet 50 is also located at the angle α (similarly measured between L1 and L2) of between 50 degrees and 70 degrees from TDC of at least one of the adjacent crankpin journals 52, 56. More specifically, the first oil inlet 50 is located at 56.3 degrees from the TDC position of second crankpin journal 56. The first oil inlet 50 is also chamfered to such that its opening covers an angle of 90 degrees. Also similar to the single oil inlet 22, the first oil inlet 50 provides access to an inlet passageway 100 having a central axis A that is perpendicular with respect to the line L1 connecting the main axis 13 of the crankshaft 12 to the TDC position of the second crankpin journal 56. The inlet passageway 100 connects to a passageway 102, the center axis of which is shown schematically in FIG. 2A, which in turn connects to respective feeder passageways, which in turn connect to oil outlets 72a, 72b in crankpin journal 52. Such an oil passageway configuration is similar to that shown and described with respect to oil outlets 68a, 68b and 70a, 70b. Thus, the above-noted oil passageways comprise a first oil passageway 102 formed in a main journal 44, a first web 54, and a first crankpin journal 52 and coupling a first oil inlet 50 to a pair of oil outlets 72a, 72b in the first crankpin journal 52.

The second oil inlet 98 (FIG. 3A) is also shown in cross-section in FIG. 6. The second oil inlet 98 is located at an angle β from top dead center (in the opposite direction of first oil inlet 50) that is also between 50 and 70 degrees, and more specifically, here is located at an angle of 63.7 degrees from TDC of the second crankpin journal 56. Here, β is measured between the line L1 and a line L3 extending through the main axis 13 and the center of the second oil inlet 98. Similar to the oil inlets 22 and 50, the oil inlet 98 is chamfered such that its opening covers and angle of 90 degrees. The center axis B of the inlet passageway 104 connected to the second oil inlet 98 is oriented at an angle of 30 degrees with respect to the line L1 connecting the main axis 13 of the crankshaft 12 to the TDC position. Referring to FIG. 3A, the oil passageways noted hereinabove further comprise a second oil passageway 106 (shown schematically) formed in the main journal 44, a second web 58, and a second crankpin journal 56 and coupling a second oil inlet 98 to a pair of oil outlets 74a, 74b in the second crankpin journal 56, such as by way of feeder passageways, as shown.

The arrangement in the first crankshaft section 14 shown and described with respect to FIGS. 4 and 5, which utilizes a single oil inlet 22 feeding bifurcating oil passageways 84, 86, can be used when the first and second crankpin journals 26, 30 are in phase with one another. The arrangement in the second crankshaft section 42 shown and described with respect to FIGS. 3A, 3B, and 6, which utilizes first and second oil inlets 50, 98 each feeding a separate oil passageway 102, 106, can be used when the first and second crankpin journals 52, 56 are not in phase with each other. In both arrangements, however, oil provided into a single main journal is thereafter provided to lubricate four rod/piston assemblies.

Figure 7:
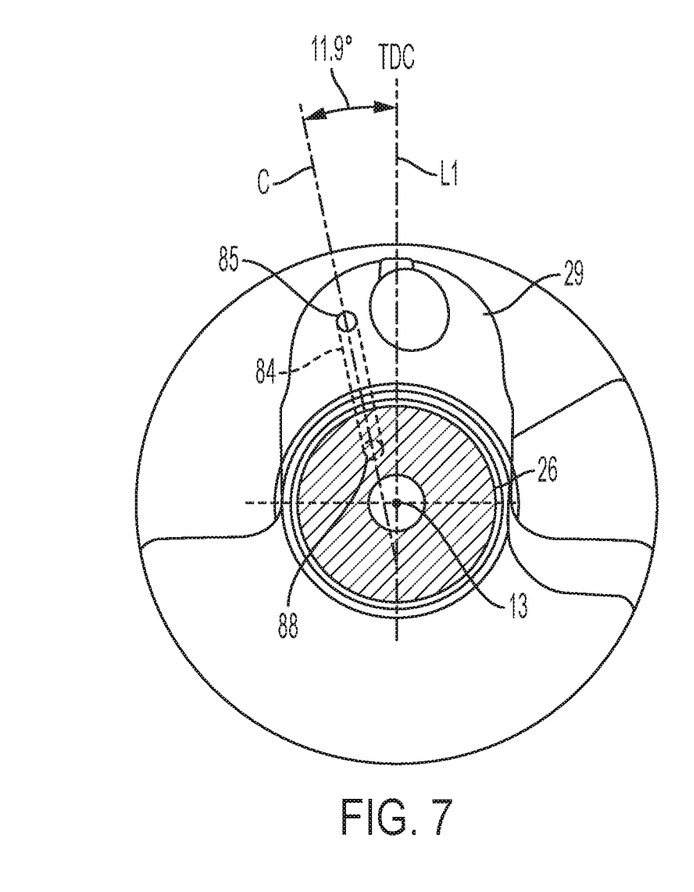
FIG. 7 illustrates a cross-sectional view taken along the line VII-VII in FIG. 2A.

FIG. 7 shows a cross-section through the crankshaft 12 taken along the line VII-VII in FIG. 2A and rotated so that TDC is at zero degrees. It shows the first oil passageway 84 extending from where it intersects with the inlet passageway 88 in the main journal 16 to where the drilling exits the web 29 on the opposite side of the crankpin journal 26. It can be seen that the center axis C of first oil passageway 84, in cross-section, extends at an angle of 11.9 degrees with respect to the line L1 connecting the main axis 13 of the crankshaft 12 to TDC. As is known, the end 85 of the drilling in the web 29 would be plugged so as not to allow oil to flow therethrough.

Figure 8:
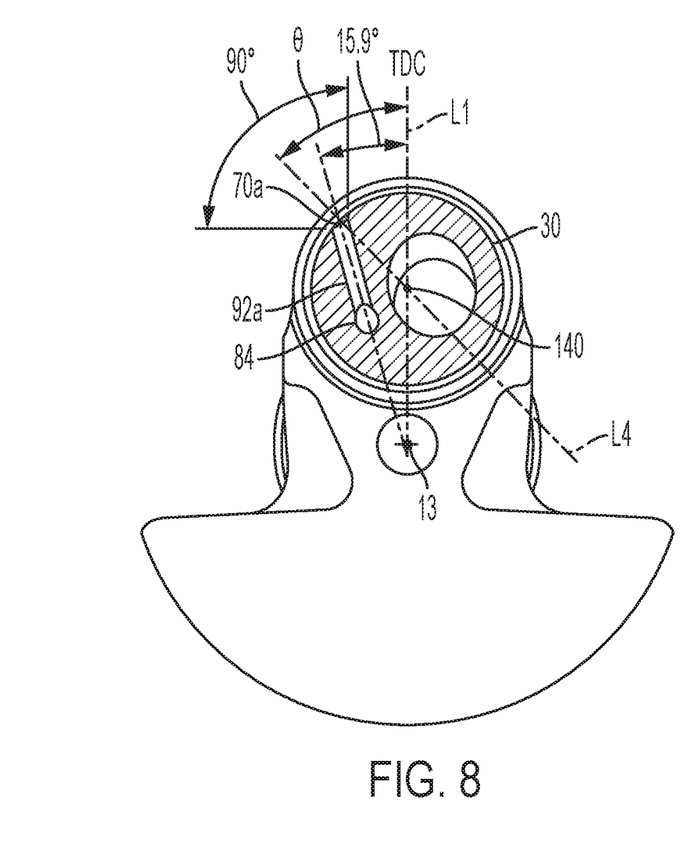
FIG. 8 illustrates a cross-sectional view taken along the line VIII-VIII in FIG. 2A.

FIG. 8 illustrates a cross-section taken along the line VIII-VIII in FIG. 2A and rotated so that TDC is at zero degrees. FIG. 8 shows where the first oil passageway 84 intersects with the feeder passageway 92a, which continues to the oil outlet 70a. The oil outlet 70a is located at an angle θ from TDC, measured between the line L1 connecting the main axis 13 of the crankshaft 12 to the crankpin axis 108 aligned to TDC position and the line L4, connecting the oil outlet 70a to the crankpin axis 108. The angle θ can be between 20 degrees and 60 degrees. In this example, θ is 45 degrees. In fact, according to the present disclosure, each oil outlet 68a, 68b; 70a, 70b; 72a, 72b; 74a, 74b in the pairs of oil outlets is located between 20 and 60 degrees from TDC of the respective first or second crankpin journal 26, 30 or 52, 56 in which the oil outlet is formed, although cross-sections of each oil outlet are not provided. The center axis D of the feeder passageway 92a extends at an angle of 15.9 degrees with respect to the line L1 connecting the main axis 13 to the TDC position; this is true of all feeder passageways in the crankshaft 12. Similar to the oil inlets 22, 50, 98, the oil outlet 70a is chamfered such that its opening covers an angle of 90 degrees; this is also true of all oil outlets in the crankshaft 12.

Although the crankshaft 12 shown and described herein is configured for use in a V12 engine, it should be understood that the crankshaft sections 14, 42, 80 could be repeated any number of times or used separately from one another for different types of engines, including inline engines having a number of cylinders other than twelve.

Thus, the present disclosure describes a crankshaft 12 having a pair of crankpin bearings 34a, 34b and 36a, 36b or 60a, 60b and 62a, 62b provided around each of first and second crankpin journals 26, 30 or 52, 56, each crankpin bearing configured to support a piston rod thereon. Each of the first and second crankpin journals 26, 30 or 52, 56 has a pair of oil outlets 68a, 68b and 70a, 70b or 72a, 72b and 74a, 74b formed therein. Each oil outlet is configured to provide oil to a respective crankpin bearing. Oil passageways 84, 86 or 102, 106 in the crankshaft 12 are configured to provide the pairs of oil outlets in both the first and second crankpin journals 26, 30 or 52, 56 with oil from an associated main journal 16 or 44. The oil passageways 84, 86 or 102, 106 extend through the associated main journal 16 or 44 and a given crankpin journal 26, 30 or 52, 56 and provide fluid communication between at least one oil inlet 22 or 50, 98 and the pair of oil outlets in the given crankpin journal.

In the above description certain terms have been used for brevity, clarity and understanding. No unnecessary limitations are to be implied therefrom beyond the requirement of the prior art because such terms are used for descriptive purposes only and are intended to be broadly construed. The different components and assemblies described herein above may be used in alone or in combination with other components and assemblies. Various equivalents, alternatives and modifications are possible within the scope of the appended claims.

What is claimed is:

1. A crankshaft comprising:
   a main journal surrounded by a main bearing defining a groove configured to be provided with oil from an oil gallery and at least one oil inlet formed in the main journal configured to provide oil from the groove into the main journal;
   a first crankpin journal connected to a first side of the main journal by way of a first web and a second crankpin journal connected to an opposite, second side of the main journal by way of a second web; and
   a pair of crankpin bearings provided around each of the first and second crankpin journals, each crankpin bearing configured to support a piston rod thereon;
   wherein each of the first and second crankpin journals has a pair of oil outlets formed therein, each oil outlet configured to provide oil to a respective crankpin bearing;
   wherein oil passageways in the crankshaft are configured to provide the pairs of oil outlets in both the first and second crankpin journals with oil from the main journal; and
   wherein the at least one oil inlet is located between 50 and 70 degrees from top-dead-center of at least one of the first and second crankpin journals.

2. The crankshaft of claim 1, wherein the oil passageways comprise an oil passageway extending through the main journal and a given crankpin journal and providing fluid communication between the at least one oil inlet and the pair of oil outlets in the given crankpin journal.

3. The crankshaft of claim 2, wherein the given crankpin journal comprises a pair of feeder passageways connecting the oil passageway to the pair of oil outlets, respectively.

4. The crankshaft of claim 1, wherein:
   the at least one oil inlet comprises a single oil inlet;
   the oil passageways comprise a first oil passageway formed in the main journal, the first web, and the first crankpin journal and coupling the single oil inlet to the pair of oil outlets in the first crankpin journal; and
   the oil passageways comprise a second oil passageway formed in the main journal, the second web, and the second crankpin journal and coupling the single oil inlet to the pair of oil outlets in the second crankpin journal.

5. The crankshaft of claim 4, wherein the first and second crankpin journals are in phase with each other.

6. The crankshaft of claim 1, wherein the at least one oil inlet and each oil outlet have chamfered openings that cover an angle of 90 degrees.

7. A crankshaft comprising:
a main journal surrounded by a main bearing defining a groove configured to be provided with oil from an oil gallery and at least one oil inlet formed in the main journal configured to provide oil from the groove into the main journal;
a first crankpin journal connected to a first side of the main journal by way of a first web and a second crankpin journal connected to an opposite, second side of the main journal by way of a second web; and
a pair of crankpin bearings provided around each of the first and second crankpin journals, each crankpin bearing configured to support a piston rod thereon;
wherein each of the first and second crankpin journals has a pair of oil outlets formed therein, each oil outlet configured to provide oil to a respective crankpin bearing;
wherein oil passageways in the crankshaft are configured to provide the pairs of oil outlets in both the first and second crankpin journals with oil from the main journal; and
wherein each oil outlet in the pairs of oil outlets is located between 20 and 60 degrees from top-dead-center of the respective first or second crankpin journal in which the oil outlet is formed.

8. The crankshaft of claim 7, wherein:
the at least one oil inlet comprises first and second oil inlets;
the oil passageways comprise a first oil passageway formed in the main journal, the first web, and the first crankpin journal and coupling the first oil inlet to the pair of oil outlets in the first crankpin journal; and
the oil passageways comprise a second oil passageway formed in the main journal, the second web, and the second crankpin journal and coupling the second oil inlet to the pair of oil outlets in the second crankpin journal.

9. The crankshaft of claim 8, wherein the first and second crankpin journals are not in phase with each other.

10. A cranktrain comprising:
a crankshaft comprising a first crankshaft section having:
  a first main journal surrounded by a first main bearing defining a groove configured to be provided with oil from an oil gallery and at least one oil inlet formed in the first main journal configured to provide oil from the groove into the first main journal;
  a first crankpin journal connected to a first side of the first main journal by way of a first web and a second crankpin journal connected to an opposite second side of the first main journal by way of a second web;
  a first pair of crankpin bearings provided around the first crankpin journal; and
  a second pair of crankpin bearings provided around the second crankpin journal;
a first pair of rods and associated pistons provided on the first pair of crankpin bearings, respectively;
a second pair of rods and associated pistons provided on the second pair of crankpin bearings, respectively;
a second crankshaft section of the crankshaft having:
  a second main journal surrounded by a second main bearing defining a groove configured to be provided with oil from the oil gallery and at least one oil inlet formed in the second main journal configured to provide oil from the groove into the second main journal;
  a third crankpin journal connected to a first side of the second main journal by way of a third web and a fourth crankpin journal connected to an opposite second side of the second main journal by way of a fourth web;
  a third pair of crankpin bearings provided around the third crankpin journal; and
  a fourth pair of crankpin bearings provided around the fourth crankpin journal;
a third pair of rods and associated pistons provided on the third pair of crankpin bearings, respectively; and
a fourth pair of rods and associated pistons provided on the fourth pair of crankpin bearings, respectively;
wherein both of the first and second crankpin journals have a pair of oil outlets formed therein, each oil outlet configured to provide oil to a respective crankpin bearing;
wherein oil passageways in the crankshaft are configured to provide the pairs of oil outlets in both the first and second crankpin journals with oil from the first main journal;
wherein each of the third and fourth crankpin journals has a pair of oil outlets formed therein, each oil outlet configured to provide oil to a respective crankpin bearing;
wherein additional oil passageways in the crankshaft are configured to provide the pairs of oil outlets in both the third and fourth crankpin journals with oil from the second main journal; and
wherein the first and second crankshaft sections are separated by a third main journal having no oil inlet formed therein.

11. The cranktrain of claim 10, wherein the oil passageways comprise an oil passageway extending through the first main journal and a given one of the first and second crankpin journals and providing fluid communication between the at least one oil inlet formed in the first main journal and the pair of oil outlets in the given one of the first and second crankpin journals.

12. The cranktrain of claim 11, wherein the given one of the first and second crankpin journals comprises a pair of feeder passageways respectively connecting the oil passageway to the pair of oil outlets in the given one of the first and second crankpin journals.

13. The cranktrain of claim 10, wherein:
the at least one oil inlet formed in the first main journal comprises a single oil inlet;
the oil passageways comprise a first oil passageway formed in the first main journal, the first web, and the first crankpin journal and coupling the single oil inlet to the pair of oil outlets in the first crankpin journal; and
the oil passageways comprise a second oil passageway formed in the first main journal, the second web, and the second crankpin journal and coupling the single oil inlet to the pair of oil outlets in the second crankpin journal.

14. The cranktrain of claim 13, wherein the first and second crankpin journals are in phase with each other.

15. The cranktrain of claim 10, wherein:
the at least one oil inlet formed in the first main journal comprises first and second oil inlets;
the oil passageways comprise a first oil passageway formed in the first main journal, the first web, and the first crankpin journal and coupling the first oil inlet to the pair of oil outlets in the first crankpin journal; and the oil passageways comprise a second oil passageway formed in the first main journal, the second web, and the second crankpin journal and coupling the second oil inlet to the pair of oil outlets in the second crankpin journal.

16. The cranktrain of claim 15, wherein the first and second crankpin journals are not in phase with each other.

17. The cranktrain of claim 10, wherein the at least one oil inlet formed in the first main journal is located between 50 and 70 degrees from top-dead-center of at least one of the first and second crankpin journals.

18. The cranktrain of claim 10, wherein each oil outlet in the pairs of oil outlets formed in the first and second crankpin journals is located between 20 and 60 degrees from top-dead-center of the respective first or second crankpin journal in which the oil outlet is formed.

19. A cranktrain comprising:
a crankshaft comprising a first crankshaft section having:
   a main journal surrounded by a main bearing defining a groove configured to be provided with oil from an oil gallery and at least one oil inlet formed in the main journal configured to provide oil from the groove into the main journal;
   a first crankpin journal connected to a first side of the main journal by way of a first web and a second crankpin journal connected to an opposite second side of the main journal by way of a second web;
   a first pair of crankpin bearings provided around the first crankpin journal; and
   a second pair of crankpin bearings provided around the second crankpin journal;
a first pair of rods and associated pistons provided on the first pair of crankpin bearings, respectively; and
a second pair of rods and associated pistons provided on the second pair of crankpin bearings, respectively;
wherein both of the first and second crankpin journals have a pair of oil outlets formed therein, each oil outlet configured to provide oil to a respective crankpin bearing;
wherein oil passageways in the crankshaft are configured to provide the pairs of oil outlets in both the first and second crankpin journals with oil from the main journal; and
wherein the at least one oil inlet is located between 50 and 70 degrees from top-dead-center of at least one of the first and second crankpin journals.

20. A cranktrain comprising:
a crankshaft comprising a first crankshaft section having:
   a main journal surrounded by a main bearing defining a groove configured to be provided with oil from an oil gallery and at least one oil inlet formed in the main journal configured to provide oil from the groove into the main journal;
   a first crankpin journal connected to a first side of the main journal by way of a first web and a second crankpin journal connected to an opposite second side of the main journal by way of a second web;
   a first pair of crankpin bearings provided around the first crankpin journal; and
   a second pair of crankpin bearings provided around the second crankpin journal;
a first pair of rods and associated pistons provided on the first pair of crankpin bearings, respectively; and
a second pair of rods and associated pistons provided on the second pair of crankpin bearings, respectively;
wherein both of the first and second crankpin journals have a pair of oil outlets formed therein, each oil outlet configured to provide oil to a respective crankpin bearing;
wherein oil passageways in the crankshaft are configured to provide the pairs of oil outlets in both the first and second crankpin journals with oil from the main journal; and
wherein each oil outlet in the pairs of oil outlets is located between 20 and 60 degrees from top-dead-center of the respective first or second crankpin journal in which the oil outlet is formed.

\* \* \* \* \*